United States Patent [19]
Baxter et al.

[11] 3,896,081
[45] July 22, 1975

[54] RAPID CURING RESIN COMPOSITIONS EMPLOYING AMINOPLAST CONDENSATION POLYMER MODIFIED WITH A DI-SUBSTITUTED BIS-ARYL AMINE

[75] Inventors: Gene F. Baxter; Harlan G. Freeman; George T. Tiedeman, all of Seattle, Wash.

[73] Assignee: Weyerhaeuser Company, Tacoma, Wash.

[22] Filed: Oct. 23, 1973

[21] Appl. No.: 408,409

Related U.S. Application Data

[60] Division of Ser. No. 148,905, June 1, 1971, Pat. No. 3,784,516, which is a continuation-in-part of Ser. No. 821,961, May 5, 1969, abandoned.

[52] U.S. Cl............ 260/47 R; 260/47 CP; 260/49; 260/51 R; 260/52; 260/67.6 R; 260/70 R; 260/828; 260/831; 260/832; 260/834
[51] Int. Cl.²......C08G 12/12; C08G 12/32; C08G 12/36; C08G 12/38
[58] Field of Search... 260/64, 70 R, 67.6 R, 47 CP, 260/47 R, 51 R, 52

[56] References Cited
UNITED STATES PATENTS

| | | | |
|---|---|---|---|
| 1,755,099 | 4/1930 | Burke | 260/64 X |
| 2,191,802 | 2/1940 | Novotny et al. | 260/64 X |
| 2,766,218 | 10/1956 | Harvey et al. | 260/64 |
| 2,839,487 | 6/1958 | Rosamilia et al. | 260/64 X |
| 3,704,269 | 11/1972 | Freeman et al. | 260/64 X |
| 3,784,516 | 1/1974 | Baxter et al. | 260/64 X |

*Primary Examiner*—Howard E. Schain
*Attorney, Agent, or Firm*—Christensen, O'Connor, Garrison & Havelka

[57] ABSTRACT

Described herein are resin products having particular utility as rapid curing adhesives for wood and other materials, and processes for making the resin compositions. The products are made by reacting aldehyde condensation polymer containing reactive alkylol groups, such as a phenol-formaldehyde condensation polymer, with di-substitued bis-aryl amine having the formula:

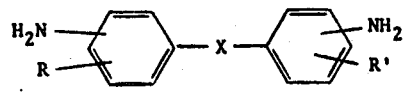

where
R and R' are alkoxy, amino, hydrogen, hydroxyl, nitro, carboxyl or $C_1$ to $C_4$ alkyl
and X is

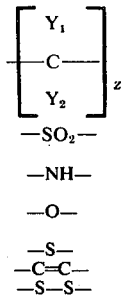

—SO$_2$—
—NH—
—O—
—S—
—C=C—
—S—S— where $Y_1$ and $Y_2$ are hydrogen or alkyl radicals having from 1 to 3 carbon atoms and Z is an integer ranging from 0 to 2;

to obtain an amine-modified polymer. When the resulting reaction product is blended with an appropriate curing agent, such as an aldehyde, the compositions cure very rapidly at ambient temperature. When pieces of wood or other materials are spread with the preferred adhesives employing the resin compositions of this invention and brought into contact with another wood surface the bond strength develops within minutes. The durability, strength and flexibility of the adhesives of this invention under adverse weathering conditions are excellent.

48 Claims, No Drawings

RAPID CURING RESIN COMPOSITIONS EMPLOYING AMINOPLAST CONDENSATION POLYMER MODIFIED WITH A DI-SUBSTITUTED BIS-ARYL AMINE

CROSS REFERENCE

This application is a division of application Ser. No. 148,905, filed June 1, 1971 (now U.S. Pat. No. 3,784,516), which is in turn a continuation-in-part of application Ser. No. 821,961, filed May 5, 1969 (now abandoned).

BACKGROUND OF THE INVENTION

This invention relates to the preparation of rapid curing resin compositions, to the resin compositions per se, and to the use of these resin compositions as adhesives.

For many years the adhesives used to bond wood together to make plywood, laminated beams, furniture, etc., have employed aldehyde condensation polymers of phenol, urea, resorcinol, etc., such as phenol-formaldehyde resins, resorcinol-formaldehyde resins, and others. Although each of these resins has advantageous characteristics, they all have relatively slow curing rates in comparison to the cure rates of the preferred resins of this invention.

The slow cure rates of these resins have necessitated long press times with concurrent restriction on production when used in the manufacture of laminated beams, plywood and other construction uses. To overcome the slow cure rates many modifications of the above resins have been proposed. Other resins, such as the expoxies, have been proposed, but their expense and certain of their physical properties have limited their use. The adhesives of this invention employ aldehyde condensation polymers modified with particular amines. These resins not only have rapid cure rates but develop adequate adhesive bond strengths in a short amount of time at ambient temperature, thereby eliminating the need for long press times and application of heat to develop sufficient bond strength.

Mazzucchelli et al, in U.S. Pat. No. 2,557,922, describe the preparation of modified phenol-formaldehyde condensation products by the inclusion of mono-amine diphenyls, diaminodiphenyls, or amino diphenylmethanes alone or as condensation products with formaldehyde. The compositions, when mixed with suitable fillers, are used primarily as electrical insulators.

Auer, in U.S. Pat. No. 2,309,088 teaches the manufacture of organic isocolloids through modification of resins with amine compounds. The isocolloids are useful, inter alia, as additives for varnishes to improve their alkali and hot and cold water resistance. Fusible phenolic resins containing a natural resin or resinous esters thereof are modified by Auer by heating with particular amines at elevated temperatures "to insure complete dissolution or dispersion of the modifying agent". It is not clear even to Auer whether any chemical reaction takes place between the phenolic resin and amine. However, if there was a reaction, the substituents such as carboxyl groups on the phenolic resins attributable to the natural resin or resinous esters thereof would result in the formation of amides, and not in the formation of the amine modified products of this invention. Amide modified condensation polymers have significantly lower reactivity for purposes of this invention than do amine modified condensation polymers, and are therefore to be avoided. Further, because Auer's phenolic resin starting materials are apparently permanently fusible, it can be inferred that they are novolacs and therefore contain no reactive alkylol groups, making them inappropriate for the practice of the present invention.

SUMMARY OF THE INVENTION

This invention relates to a process for the preparation of rapid curing resin compositions for use as adhesives, and to the compositions per se, and particularly to the addition of a curing agent to the reaction product of a di-substituted bis-aryl amine with an aldehyde condensation polymer having reactive alkylol groups.

This invention is also directed to a method of bonding a plurality of members, one to the other, comprising applying to a surface of a first member a first component comprising an amine modified aldehyde condensation polymer of this invention, applying to a surface of a second member a second component comprising a curing agent in an amount sufficient to cause said first component to become infusible, and assembling the first and second member so that the first and second components are brought into intimate reacting contact.

The resins of this invention are prepared by reacting together an aldehyde condensation polymer having reactive alkylol groups with bis-aryl amines having the formula:

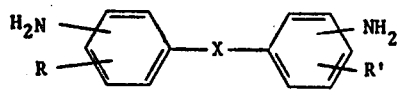

where
R and R' are alkoxy, amino, hydrogen, hydroxyl, nitro, carboxyl or $C_1$ to $C_4$ alkyl
and X is

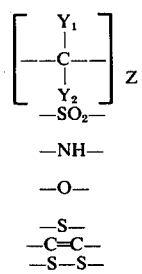

—$SO_2$—
—NH—
—O—
—S—
—C=C—
—S—S— where $Y_1$ and $Y_2$ are hydrogen or alkyl radicals having from 1 to 3 carbon atoms and Z is an integer ranging from 0 to 2;

to produce an amine-modified polymer. This resinous product is then blended with a sufficient amount of a curing agent to cause the resin to become infusible. On addition of the aldehyde to the amine-modified condensation polymer the material sets to an insoluble, infusible condition at ambient temperature in less than one minute in many cases. Optionally, heat may be applied to increase cure speed.

The resin compositions can be used to bond wood to wood, metal to metal, wood to metal, fabric, and many other materials where durable, moisture-resistant, heat resistant adhesive compositions are needed.

DESCRIPTION OF THE PREFERRED EMBODIMENTS

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. "Polymers", as used herein, means resinous mixtures which do not crystallize or have a sharp melting point. "Reactive alkylol groups" are alkylol groups capable of reacting with the amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Pat. No. 480,316.

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermosetting phenol-aldehyde resins. Novolacs, because they lack reactive alkylol groups, are not directly useful in this invention; they may be further reacted with aldehyde to convert them to useful resoles.

A preferred resin is an ortho-condensed phenolformaldehyde resin made by condensing 0.7 to 1.0 moles formaldehyde with 1 mole phenol in the presence of an ortho-directing catalyst such as calcium acetate. Such resins are known. Each of the aldehyde condensation polymers mentioned above is prepared and kept under conditions which prevent it from condensing to an infusible state by known methods. Although phenol is the preferred reactant, the phenolic resins may be modified by incorporating into them predetermined amounts of other monohydric phenols, other dihydric phenols such as resorcinol, or other polyhydroxy aromatic compounds.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

In the method of this invention the aldehyde condensation polymers mentioned above are modified by reaction with a bis-aryl amine to give an amine-modified polymer. It is necessary, in order to produce the low-temperature fast curing products of this invention, to first produce the aldehyde condensation polymer and then subsequently modify that polymer with the bis-aryl amine. Simultaneous reaction of all the reactants, i.e., phenol, formaldehyde and bis-aryl amine, produces an inferior, heterogeneous mass, i.e., comprising essentially an amineformaldehyde condensation polymer containing free phenol.

The amount of amine used to react with the condensation polymer ranges from about 0.05 to 2.0 parts by weight of the amine to each part of the condensation polymer and preferably 0.1 to 1.0 parts by weight of the amine to each part of the condensation polymer. More than 2.0 parts by weight of the amine to each part of the aldehyde condensation polymer can be used but there is little advantage in doing so. Most of the bis-aryl amine compounds disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the bis-aryl amine compound to the prepared polymer. It may be desirable under some circumstances, however, to add the polymer to solution of the bis-aryl amine compound When the resin is ready to be used, a curing agent is blended therein.

The amines useful for modifying the aldehyde condensation polymers include amines having the formula:

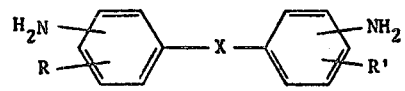

where
R and R' are alkoxy, amino, hydrogen, hydroxyl, nitro, carboxyl or $C_1$ to $C_4$ alkyl
and X is

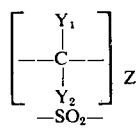

—NH—
—O—
—S—
—C=C—
—S—S— where $Y_1$ and $Y_2$ are hydrogen or alkyl radicals having from 1 to 3 carbon atoms and Z is an integer ranging from 0 to 2;

The following amines are exemplary of those that may be used in the preparation of these resins: 3,3′-dimethoxybenzidine, 4,4′-oxydianiline, o-tolidine, 4,4′-diaminodiphenylsulfone, 3,3′-diaminobenzidine, 4,4′-diaminodiphenylamine, 4,4′-diaminostilbene, 4,4′-methylenedianiline and 4,4′-diaminodiphenyldisulfide.

Bis-aryl amines having the basic structures of those suggested above, but further substituted with non-interfering substituents, are also useful in this invention. By "non-interfering substituents" is meant those substituents which do not detract from the usefulness of the bis-aryl amines in this invention. For example, halogen, ether, alkyl, aryl, cyano, sulfide, and mercaptan groups are non-interfering substituents which could be attached to the carbon rings of the suggested amines without reducing their usefulness, i.e., without significantly changing resin shelf life or adhesive cure speed. A bis-aryl amine containing such a non-interfering substituent which is found to be satisfactory for purposes of this invention is 4,4′-diamino-3,3′-dimethylbiphenol.

Also useful for purposes of this invention are the acid salts of the suggested bis-aryl amines, which salts are formed by the reaction of such amines with nonoxidizing acids such as the hydrohalide acids, sulphuric acid, phosphoric acid, acetic acid, propionic acid, butyric acid, and the like. These salts are equivalent, for purposes of this invention, to the free amines, and will normally be present in the reaction system when the aldehyde condensation polymer is reacted with the amine under acidic conditions.

The amine-modified aldehyde condensation polymers described above make up the first component of the resin composition. The first component is prepared so as to have a relatively long storage life so it can be shipped and stored for fairly long periods of time without gelation.

The second component of the resin composition is a curing agent which may be an alkylene donating compound, a diisocyanate, or an epoxide, used either alone, in combination with one another, and/or mixed with conventional thickening agents. The curing agent is blended with the modified aldehyde condensation polymer when needed. Other materials that readily donate alkylene bridges to the polymer system are also generally suitable. Reaction takes place at ambient temperature and the blended mixture gels rapidly to an insoluble, infusible state. The preferred resins of this invention set to an insoluble infusible state within a few minutes. "Insoluble" is intended to mean not soluble in common solvents such as water, alcohols, ketones, hydrocarbons, esters, glycols, and the like. Optionally, heat may be applied to the curing composition if desired to further decrease the required cure time.

Sufficient curing agent is added to the first component to form an insoluble infusible product. The amount of curing agent may range from 0.02 to 1.0 parts by weight aldehyde per part of amine-modified condensation polymer; as stoichiometric proportions are approached and surpassed the completeness of the cure approaches 100%.

The preferred curing agent is an aldehyde such as formaldehyde, though the formaldehyde-forming compounds polyoxymethylene, trioxane and paraformaldehyde are quite satisfactory. Other aldehydes may be also used, for example, aliphatic or cyclic aldehydes having from 1 to 8 carbon atoms such as acrolein, glyoxal, acetaldehyde, propionaldehyde, butyraldehyde, and furfuraldehyde. Phenolic resoles and other similar polymers having free methylol groups are also efficient curing agents. Suitable diisocyanate curing agents comprise tolylene diisocyanate, phenylene diisocyanate, 1,6-hexane-diisocyanate, and the like, while suitable epoxy curing agents comprise the diglycidyl ether of bisphenol A, epoxidized phenolic novolacs, epoxidized polyglycols and the like.

When the first component comprising the amine-modified condensation polymer and the second component comprising the aldehyde are mixed together the composition becomes infusible in a very short period of time. When bonding materials together the two components are kept separate until they are needed. They are then intimately mixed and spread on the material to be bonded by any conventional means. An automatic mixing-dispensing gun is most useful in this regard.

Certain of the resin compositions of this invention have such rapid cure times that they begin to cure before they can be spread on the material to be bonded. To overcome this problem the first component can be spread on one surface of the material to be bonded and the second component spread on the second surface to be bonded. When the surfaces are brought into contact the first and second resin components react forming an infusible glue line between the materials. Such a process is described, for example, in U.S. Pat. No. 2,557,826 using phenol-resorcinol-formaldehyde resins.

If desired, other ingredients can be added to the resin adhesive compositions. Such ingredients include conventional fillers, pigments, plasticizers, and the like in amounts ordinarily employed for such purposes. Additionally the adhesive compositions develop bond strength sufficient to hold articles together in a relatively short amount of time.

The compositions of this invention do not need additional catalyst or heat to cure them. They are curable at ambient temperatures and in very short time periods after mixing of the two components. Additionally, the resin compositions develop bond strength sufficient to hold articles together in a relatively short amount of time.

The following examples illustrate this invention. Parts and percents where used are intended to be parts and percents by weight, unless otherwise specified.

EXAMPLE 1

This example illustrates the fast cure rates of the resin compositions of this invention. Cure rate was determined by means of "gel" time. Gel time was determined by weighing out a 10 gram aliquot of the first component, adjusting the pH to the desired point, and mixing the second component with the first component. The time elapsed from mixing to gelling of the composition is termed "gel time". In each instance, the compositions were formulated by mixing an amine-modified phenol-formaldehyde polymer with additional formaldehyde. The phenol-formaldehyde polymer was prepared by mixing 42.06 parts by weight phenol, 4.51 parts water, 11.35 parts flake paraformaldehyde (91%) and 0.46 parts calcium acetate monohydrate. The mixture was brought to reflux (approximately 109°C.) in about 60 minutes at a uniform rate and held at reflux for 120 minutes. To separate 100 gram aliquots of this prepolymer was added 0.305 moles of the respective amines in Table 1. The mixture in each case was refluxed for 2.25 hours, cooled, and 26.3 frams of methanol stirred into the mixture. A 10-gram aliquot of the amine-modified resin was then weighed out, the pH adjusted, and 2.5 ml. of 55% formaldehyde in methanol-water solution added. The mixture was stirred rapidly until gelled, and the time recorded. The solution pH has some effect on the gel time of the resins. This pH effect is dependent primarily on the particular amine used but also on the solvent used and the concentration of the amine. Table I lists the amines used, the gel time and the pH range over which the gel times were obtained. Though the cure rates of many of the resins are pH dependent, the determination of the optimum pH for a desired gel time can be easily determined by a skilled technician.

TABLE I

| Compound | Gel Time | pH Range |
| --- | --- | --- |
| 3,3'-dimethoxybenzidine | Less than 100 secs. | More than 8 |
| 4,4'-oxydianiline | " | More than 5 |
| o-tolidine | " | More than 11 |
| 4,4'-diaminodiphenylsulfone | About 100 secs. | 2–8 |
| 4,4'-diaminodiphenylamine | Less than 100 secs. | 4.5–11.0 |
| 3,3'-diaminobenzidine | Less than 100 secs. | 7–10 |
| 4,4'-diaminodiphenylmethane | Less than 100 secs. | 3–10 |

EXAMPLE 2

To 100 grams of high solids phenol-formaldehyde prepolymer prepared as described in Example 1 was added 0.305 moles of 3,3'-dimethoxybenzidine. The mixture was refluxed for 2.25 hours, cooled, and 26.3 grams of methanol stirred into the mixture. A 10-gram aliquot of the amine-modified resin was weighed out, and 5.0 grams of a hardener added, the hardener comprising a solution of 55% formaldehyde in methanol and water thickened with a small quantity of refined chrysotile asbestos (96.4% formaldehyde solution and 3.6% asbestos). The mixture was stirred rapidly and used in a cross-lap test.

The cross-lap test is conducted by spreading the adhesive composition on the central area of a piece of Douglas fir wood 1 inch wide by approximately ¾ inch thick and 2 ¾ inch long. a similar piece of Douglas fir wood is immediately laid over the first with the grain direction at right angles. A measured quantity of adhesive may be used or an excess may be applied with the surplus resin allowed to squeeze out of the joint. the latter method has been used for the examples given here. As soon as the cross-lap is laid on the first piece, a pressure of 40 pounds is applied for the desired length of time. The joint is then broken in tension and the bond strength recorded. At the end of 12 minutes press time the tensile strength necessary to separate the cross-lap was 65 pounds per sq. in.

Normally wood failure begins to occur at a value of about 150 psi. For many purposes, however, a bond strength well below this value is wholly satisfactory It should also be noted that strength usually continues to increase significantly for at least a 24-hour period after initial assembly.

EXAMPLE 3

A resin was made in similar fashion to that of the preceding example except that the amine compound of the resin was 0.305 moles of 4,4'-diaminodiphenyldisulfide. The resin was used in a cross-lap test with 2 parts by weight of the resin being mixed with 1 part of the asbestos-thickened aldehyde hardener. After 12 minutes press time a tensile strength of 45 psi had developed in the glue joint. The gel time of the adhesive composition was 21 seconds at pH 6.6.

EXAMPLE 4

A resin was made according to the procedure described in Example 2, using 0.305 moles of trans-4,4'-diaminostilbene as the amine component. Used in a cross-lap test in a ratio of 2 parts resin to 1 part asbestos-thickened aldehyde hardener a joint strength of 230 psi was developed in 12 minutes. The gel time of the adhesive composition was 15 seconds at pH 5.7.

EXAMPLE 5

To 100 grams of the phenol-formaldehyde prepolymer prepared as described in Example 1 was added 0.305 moles (61.0 grams) of 4,4'-oxydianiline. The mixture was refluxed for 2 ¼ hours, cooled and 26.3 grams of methanol stirred into the mixture.

A cross-lap test was run by taking 10 grams of the above resin and 5 grams of the asbestos-thickened aldehyde hardener described in Example 2 and mixing rapidly before application. After 12 minutes press time the tensile strength was 85 psi. The gel time of the adhesive composition was 20 seconds.

EXAMPLE 6

A resin was made in similar fashion to the one described in Example 5 except that 0.305 moles (61.0 grams) of 4,4'-methylenedianiline was used in place of the oxydianiline.

The cross-lap made as described had a tensile strength of 55 psi after 12 minutes cure time. The gel time was 10 seconds.

EXAMPLE 7

A resin was made by adding to a reactor 1 part by weight of 4,4'-methylenedianiline and 1 part of N,N-dimethylformamide and heating gently with agitation until a homogeneous mixture was obtained. To this mixture was added 1.5 parts of a powdered melamine-urea-formaldehyde resin (Melurac 400, a product of American Cyanamid Company). This is a 100% solids, spray-dried adhesive resin typical of many similar products commercially available which are intended for hot press or radio frequency bonding of wood products. Resins of this type are described in British Pat. No. 480,316. Agitation was continued until all traces of exotherm had ceased whereupon the reaction product was cooled to room temperature and withdrawn to storage.

A cross-lap test was run using an adhesive comprising 10 parts by weight of the above resin, 1.4 parts of concentrated hydrochloric acid and 5 parts of the asbestos-thickened aldehyde hardener of Example 2. After 12 minutes press time the joint had a tensile strength of 140 psi. The gel time was 60 seconds.

EXAMPLE 8

A resin was made by adding 5.0 grams of 4,4'-oxydianiline and 7.5 grams of N,N-dimethylformamide to a reaction vessel with warming and mixing until homogeneous. To this was slowly added with agitation 15.0 grams of a urea-formaldehyde resin (Amres 255, a product of Pacific Resins and Chemicals Co.). Amres 255 is typical of many general prupose liquid urea-formaldehyde adhesive resins readily available on the market. It is made with an approximate 2 to 1 molar ratio of formaldehyde to urea and is cooked to a Gardner viscosity of "U" at a pH of 8.0 and contains 65% resin solids in a water solution. The mixture was heated to 60°C and held for 10 minutes, then cooled.

Cross-laps were made using as the adhesive a mixture of 10 parts of the above resin, 1 part of concentrated hydrochloric acid and 5 parts of the asbestos-thickened aldehyde hardener of Example 2. After 12 minutes press time the cross-lap joint had developed a strength of 75 psi. The gel time was 240 seconds.

EXAMPLE 9

A resin similar to the above was made in which 4,4'-methylenedianiline was used in place of the oxydianiline. The reactor was charged with 1 part of methylenedianiline and 1 part by weight of N,N-dimethylformamide with gentle heating and mixing until the charge was homogeneous. Three parts of the urea-formaldehyde resin of Example 8 were slowly added. When any exotherm had totally subsided the product was cooled and withdrawn to storage.

Cross-laps were made using an adhesive comprising 10 parts of the above resin, 1 part of concentrated hydrochloric acid and 5 parts of the asbestos-thickened hardener of Example 2. After 12 minutes press time a tensile strength of 60 psi was measured. the gel time was 70 seconds.

EXAMPLE 10

This experiment was conducted to demonstrate the disadvantage of simultaneous reaction of a bis-aryl amine with the reactants used to produce an aldehyde condensation polymer. (As previously suggested, it is generally better to first produce the aldehyde condensation polymer and subsequently react it with the amine.)

The following ingredients were placed in a reactor:
10.58 gms of 91.4% phenol
0.19 gms water
2.55 gms 93.2% flake paraformaldehyde
0.11 gms calcium acetate monohydrate
19.87 gms 4,4'-diaminostilbene dihydrochloride
3.53 gms methanol
11.29 gms 49.7% sodium hydroxide The mixture was difficult to stir and there was localized reaction where the sodium hydroxide concentration was the highest. The temperature rose to about 60°C spontaneously and the mixture hardened to a crumbly mass which was unusable.

EXAMPLE 11

This experiment was conducted to demonstrate the advantage of preparing the resin of this invention by reacting the bis-aryl amine with a previously prepared aldehyde condensation polymer, as opposed to simultaneous reaction of the amine with the reactants used to produce the aldehyde condensation polymer. The experiment also illustrates the use of a curing agent comprising an aldehyde-epoxide mixture.

Preparation of a Resin of This Invention

An aldehyde condensation polymer was prepared as follows. The following ingredients were placed in a reactor:
42.06 parts phenol
11.35 parts of 91% flake paraformaldehyde
4.51 parts water
0.46 parts calcium acetate monohydrate The above ingredients were mixed together and the temperature of the mixture adjusted to 25°C. The mixture was then heated at a uniform rate over a period of 60 minutes to a final reflux temperature of 109°C. Refluxing was continued for 120 minutes followed by cooling of the resultant reaction product.

an expoxide-aldehyde curing agent was prepared by mixing the following ingredients:
49.08 parts formaldehyde solution (55% formaldehyde in methanol-water solution)
1.84 parts asbestos
49.08 parts epoxy resin made by the epoxidation of a phenol-formaldehyde novolac, the epoxide resin having an average of 2.2 epoxy groups per molecule (DEN 431, an epoxidized novolac, made by the Dow Chemical Co.)

A modified aldehyde condensation resin of this invention was prepared as follows. A mixture of 100 grams of the aldehyde condensation polymer described above and 0.305 moles of 4,4'-oxydianiline were heated to reflux for 2.25 hours, cooled, and then mixed with 26.3 grams of methanol.

The gel time for a mixture of the modified aldehyde condensation resin and the epoxide-aldehyde curing agent was measured as follows. To 10 grams of the resin was added 5 grams of curing agent. The mixture was stirred rapidly until gelled and the time recorded. Gel time in this case was 90 seconds.

The strength of the modified aldehyde condensation resin as an adhesive was measured as follows. The resin and curing agent were mixed in the same manner as in the determination of gel time, and spread on a wood block before the resin gelled. Another wood block was placed on top of the resin and pressed at 40 psi for 12 minutes. This was followed by measurement of the tensile force-per-unit area necessary to separate the blocks. In this case a force of 130 psi was required.

Simultaneous Mixture of All Ingredients

An attempt was made to repeat the above experiment using identical ingredients and a procedure which involved simultaneous reaction of the 4,4'-oxydianiline with the ingredients used in the preparation of the aldehyde condensation polymer. The phenol, calcium acetate, and 4,4'-oxydianiline were mixed together and the formaldehyde added slowly at elevated temperature. The mixture was then refluxed for 2.25 hours, cooled, and the reamining water added. The resulting product was a heterogeneous mass which did not gel after an extended period of time, and which required a breaking force of only 10 psi in the wood block test.

EXAMPLE 12

This experiment was conducted to demonstrate the use of a curing agent comprising a diisocyanate.

An aldehyde condensation polymer was prepared as described in Example 11. To 316.7 grams of this polymer was added 82.4 grams of 4,4'-methylenedianiline. The mixture was then heated to reflux at 102°C and refluxing was continued for 2 ½ hours. the mixture was then cooled to 50°C and mixed with 66.8 grams of methanol, 9.8 grams of powdered asbestos, and 14.9 grams of 38% hydrochloric acid. The temperature was held at 50°C for 30 minutes and then lowered to room temperature. A 32.0 gram aliquot of this product was then mixed with 5.0 grams of methanol, 8.0 grams dimethyl sulfoxide, and 2.5 grams of 38% hydrochloric acid. To 3.0 grams of the latter mixture were added 0.4 grams of curing agent 2,4-tolylene diisocyanate. The mixture was stirred rapidly and gelled in about 10 seconds. Next, a fresh mixture of the same resin and curing agent used in the gel time determination was prepared and spread on a wood block which was then covered with a second block. The resulting sandwich was pressed at 40 psi for 12 minutes. A force of 85 psi was then required to separate the blocks.

What is claimed is:

1. an amine-modified condensation polymer comprising the reaction product of an aminoplast containing reactive alkylol groups with a bis-aryl amine of the formula

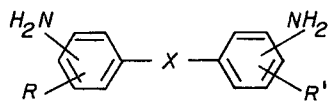

wherein R and R' are alkoxy, amino, hydrogen, hydroxyl, nitro, carboxyl or alkyl of 1 to 4 carbon atoms and X is —NH—, —O—, —C=C—, —S—, —S—S—, —SO$_2$— or

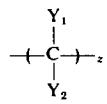

where Y$_1$ and Y$_2$ are hydrogen or alkyl of 1 to 3 carbon atoms and z is 0, 1 or 2; said reaction product being further reactable at ambient temperatures with a curing agent to form an insoluble, infusible product.

2. The modified polymer of claim 1 wherein said amine is 4,4'-methylenedianiline.

3. the modified polymer of claim 1 wherein said amine is 4,4'-oxydianiline.

4. The modified polymer of claim 1 wherein said amine is 4,4'-diaminodiphenylamine.

5. The modified polymer of claim 1 wherein said amine is o-tolidine.

6. The modified polymer of claim 1 wherein said aminoplast comprises the condensation product of formaldehyde with urea, melamine or melamine-urea.

7. The modified polymer of claim 6 wherein the amount of said amine is from 0.05 to 2.0 parts by weight per part of said aminoplast.

8. The modified polymer of claim 6 wherein the amount of said amine is from 0.1 to 1.0 part by weight per part of said aminoplast.

9. The modified polymer of claim 6 wherein said amine is 4,4'-methylenedianiline, 4,4'-oxydianiline, 4,4'-diaminodiphenylamine or o-tolidine.

10. The modified polymer of claim 9 wherein the amount of said amine is from 0.05 to 2.0 parts by weight per part of said aminoplast.

11. The modified polymer of claim 9 wherein the amount of said amine is from 0.1 to 1.0 part by weight per part of said aminoplast.

12. The modified polymer of claim 1 wherein the amount of said amine is from 0.05 to 2.0 parts by weight per part of said aminoplast.

13. The modified polymer of claim 12 wherein said aminoplast is a urea-formaldehyde resin.

14. The modified polymer of claim 13 wherein said amine is 4,4'-methylenedianiline, 4,4'-oxydianiline, 4,4'-diaminodiphenylamine or o-tolidine.

15. The modified polymer of claim 1 wherein the amount of said amine is from 0.1 to 1.0 part by weight per part of said aminoplast.

16. The modified polymer of claim 15 wherein said aminoplast is a urea-formaldehyde resin.

17. The modified polymer of claim 16 wherein said amine is 4,4'-methylenedianiline, 4,4'-oxydianiline, 4,4'-diaminodiphenylamine or o-tolidine.

18. The modified polymer of claim 1 wherein said aminoplast is a urea-formaldehyde resin.

19. The modified polymer of claim 18 wherein the amount of said amine is at least 0.1 part by weight per part of said aminoplast.

20. The modified polymer of claim 1 wherein said aminoplast is a melamine-urea-formaldehyde resin.

21. The modified polymer of claim 20 wherein the amount of said amine is at least 0.1 part by weight per part of said aminoplast.

22. The modified polymer of claim 1 wherein said aldehyde is formaldehyde.

23. The modified polymer of claim 1 wherein the amount of said amine is at least 0.1 part by weight per part of said aminoplast.

24. A rapid curing adhesive composition comprising
a. an amine-modified condensation polymer comprisng the reaction product of an aminoplast containing reactive alkylol groups with a bis-aryl amine of the formula

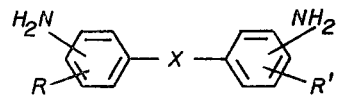

wherein R and R' are alkoxy, amino, hydrogen, hydroxyl, nitro, carboxyl or alkyl of 1 to 4 carbon atoms and X is —NH—, —O—, —C=C—, —S—, —S—S—, —SO$_2$— or

where Y$_1$ and Y$_2$ are hydrogen or alkyl of 1 to 3 carbon atoms and z is 0, 1 or 2; the amount of said amine being at least 0.1 part by weight per part of said aminoplast;
b. a curing agent reactable with said modified condensation polymer at ambient temperatures, the amounts of said modified polymer and curing agent being sufficient to cause said composition to rapidly become insoluble and infusible at ambient temperatures.

25. The composition of claim 24 wherein said amine is 4,4'-methylenedianiline, 4,4'-oxydianiline, 4,4'-diaminodiphenylamine or o-tolidine.

26. The composition of claim 24 wherein said curing agent comprises an alkylene donating compound, a diisocyanate, or an epoxide.

27. The composition of claim 24 wherein said curing agent comprises an alkylene donating compound.

28. The composition of claim 24 wherein said curing agent comprises formaldehyde.

29. The composition of claim 24 wherein the amount of curing agent is from 0.02 to 1.0 part by weight per part by weight of said modified condensation polymer.

30. THe composition of claim 24 wherein said aminoplast is a urea-formaldehyde resin.

31. The composition of claim 30 wherein the amount of said amine is from 0.1 to 1.0 part by weight per part of said aminoplast.

32. The composition of claim 31 wherein said amine is 4,4'-methylenedianiline, 4,4'-oxydianiline, 4,4'-diamiodiphenylamine or o-tolidine.

33. The composition of claim 24 wherein said aminoplast is a melamine-urea-formaldehyde resin.

34. The composition of claim 33 wherein the amount of said amine is from 0.1 to 1.0 part by weight per part of said aminoplast.

35. The composition of claim 34 wherein said amine is 4,4'-methylenedianiline, 4,4'-oxydianiline, 4,4'-diaminodiphenylamine or o-tolidine.

36. A process for the preparation of a rapid curing adhesive comprising
   1. blending together at ambient temperatures
      a. an amine-modified condensation polymer comprising the reaction product of an aminoplast containing reactive alkylol groups with a bis-aryl amine of the formula

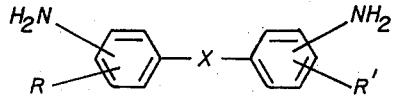

wherein R and R' are alkoxy, amino, hydrogen, hydroxyl, nitro, carboxyl or alkyl of 1 to 4 carbon atoms and X is —NH—, —O—, —C=C—, —S—, —S—S—, —SO₂— or

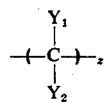

where $Y_1$ and $Y_2$ are hydrogen or alkyl of 1 to 3 carbon atoms and z is 0, 1 or 2; the amount of said amine being at least 0.1 part by weight per part of said aminoplast; said aminoplast comprising the condensation product of an aldehyde and urea, melamine or melamine-urea; and
      b. a curing agent reactable with said modified condensation polymer at ambient temperatures, the amounts of said modified polymer and curing agent being sufficient to cause said composition to rapidly become insoluble and infusible at ambient temperatures; and
   2. allowing the resulting blend to cure to an insoluble, infusible state at ambient temperatures.

37. The process of claim 36 wherein said amine is 4,4'-methylenedianiline, 4,4'-oxydianiline, 4,4'-diaminodiphenylamine or o-tolidine.

38. The process of claim 36 wherein said curing agent comprises an alkylene donating compound, a diisocyanate or an epoxide.

39. The process of claim 36 wherein said curing agent comprises an alkylene donating compound.

40. The process of claim 36 wherein said curing agent comprises formaldehyde.

41. The process of claim 36 wherein the amount of curing agent is from 0.02 to 1.0 part by weight per part by weight of said modified condensation polymer.

42. The process of claim 36 wherein said aminoplast is a urea-formaldehyde resin.

43. The process of claim 42 wherein the amount of said amine is from 0.1 to 1.0 part by weight per part of said aminoplast.

44. The process of claim 43 wherein said amine is 4,4'-methylenedianiline, 4,4'-oxydianiline, 4,4'-diaminodiphenylamine or o-tolidine.

45. A process for producing a liquid amine-modified condensation polymer comprising reacting at elevated temperatures an aminoplast containing reactive alkylol groups with a bis-aryl amine of the formula

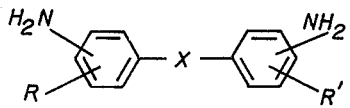

wherein R and R' are alkoxy, amino, hydrogen, hydroxyl, nitro, carboxyl or alkyl of 1 to 4 carbon atoms and X is —NH—, —O—, —C=C—, —S—, —S—S—, —SO₂— or

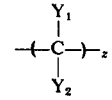

where $Y_1$ and $Y_2$ are hydrogen or alkyl of 1 to 3 carbon atoms and z is 0, 1 or 2; the amount of said amine being at least 0.1 part by weight per part of said aminoplast; and said amine-modified polymer being liquid and further reactable at ambient temperatures with a curing agent to form an insoluble, infusible product.

46. The process of claim 45 wherein said aminoplast is a urea-formaldehyde resin.

47. The process of claim 45 wherein said amine is 4,4'-methylenedianiline, 4,4'-oxydianiline, 4,4'-diaminodiphenylamine or o-tolidine.

48. The process of claim 47 wherein said aminoplast is a urea-formaldehyde resin.

* * * * *